United States Patent [19]
McNicoll

[11] 3,990,404
[45] Nov. 9, 1976

[54] DOUBLE ACTION, TWO WAY SLIP NOOSE

[76] Inventor: Alfred W. McNicoll, 4611 Elida Road, Lima, Ohio 45807

[22] Filed: Apr. 9, 1975

[21] Appl. No.: 566,414

[52] U.S. Cl.............................. 119/109; 24/73 A; 403/209
[51] Int. Cl.² ........................................ A01K 27/00
[58] Field of Search .......... 119/109, 106, 126, 153; 24/73 A, 115 R, 115 H, 115 K; 403/209, 212; 54/34

[56] References Cited
UNITED STATES PATENTS

| | | | |
|---|---|---|---|
| 153,724 | 8/1874 | Schmidt | 54/34 |
| 957,297 | 5/1910 | Ashdown | 24/115 R |
| 1,037,782 | 9/1912 | Luecke | 54/34 |
| 2,289,802 | 7/1942 | Norton | 119/109 |

Primary Examiner—J.N. Eskovitz
Attorney, Agent, or Firm—Clarence A. O'Brien; Harvey B. Jacobson

[57] ABSTRACT

A noose for dogs and other animals has a single elongated flexible member terminating in interengaging eyes, with an intermediate portion of the flexible member being slidably received in one of the eyes for forming a pair of loops. One of the loops is arrangeable around the neck of an animal, such as a dog, and the other of the loops forms a handle. By pulling on the portion of the handle-forming loop which passes through the one of the eyes, the loop encircling the neck of the animal will be restricted, and conversely pulling on the other portion of the handle-forming loop will cause the animal-engaging loop to be expanded.

8 Claims, 3 Drawing Figures

DOUBLE ACTION, TWO WAY SLIP NOOSE

BACKGROUND OF THE INVENTION

1. Field of the Invention

This invention relates generally to a harness, and particularly to a two-way slip noose for handling dogs and other animals.

2. Description of the Prior Art

U.S. Pat. No. 2,187,021, issued Jan. 16, 1940 to J. L. Everson, discloses an animal harness wherein a strap has the ends thereof connected to a slide through which the intermediate portion of the strap passes in order to form a pair of loops, one of which loops passes around the neck of an animal, and the other loop of which passes around the torso of the animal. When a leash is attached to the loop arranged on the torso of the animal, any pressure exerted on the leash will tend to put extreme stress on the neck of the animal, or on the animal's back when the leash is fastened to the neck-engaging loop. Accordingly, this known animal harness is suited only for larger dogs, and the like, that must be kept under constant control.

U.S. Pat. No. 2,458,489, issued Jan. 4, 1949 to A. L. Hallander, discloses a leash for animals which suffers from the same drawback as the harness of U.S. Pat. No. 2,187,021, discussed above, in that the tightness of the harness on the neck of the animal cannot be readily controlled by a person grasping the leash. This is a distinct disadvantage when it is considered that with these prior art devices one must get close to the mouth of the animal in order to loosen the neck-engaging loop, thereby taking the risk of being bitten by the animal. This is especially a problem for veterinarians, zoo keepers, dogcatchers, and other persons handling dangerous animals.

U.S. Pat. No. 1,800,421, issued Apr. 14, 1931 to J. D. Wickersham et al, discloses an adjustable dog harness similar to that of U.S. Pat. No. 2,187,021 discussed above, but having a double slide as opposed to the harness of the latter mentioned patent. Thus, this known harness does not eliminate any of the problems mentioned above as regards harnesses of this kind.

SUMMARY OF THE INVENTION

It is an object of the present invention to provide a combined harness and leash for dogs and like animals which is simple yet rugged in construction and facilitates control of an animal being restrained.

It is another object of the present invention to provide a harness-leash combination that will fit any size dog, even cats, and the like, that are leash trained.

It is yet another object of the present invention to provide a harness-leash combination that permits complete control of the tightness of a loop around the neck of the animal without requiring one to approach the animal in order to achieve such control.

It is yet another object of the present invention to provide a restraining device for dogs and like animals which includes a leash integral with the device.

These and other objects are achieved according to the present invention by providing a noose for dogs and other animals which has: a single elongated flexible member including an intermediate portion and a pair of spaced end portions terminating in interengaging eyes, with the intermediate portion of the flexible member being slidably received in one of the eyes for forming a pair of loops; with one of the loops being arrangeable around the neck of an animal, and the other of the loops forming a handle, wherein pulling of a one portion of the other of the loops arranged passing through the one of the eyes away from the one of the loops restricts the one of the loops, and pulling on the other portion of the other of the loops away from the one of the loops expands the one of the loops.

Preferably, the flexible member is a continuous piece of firm cord, and each of the eyes terminating the ends of the cord are formed by at least one S-shaped clip securing together in a side-by-side relationship a doubled-over length of the associated one of the end portions of the flexible member.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
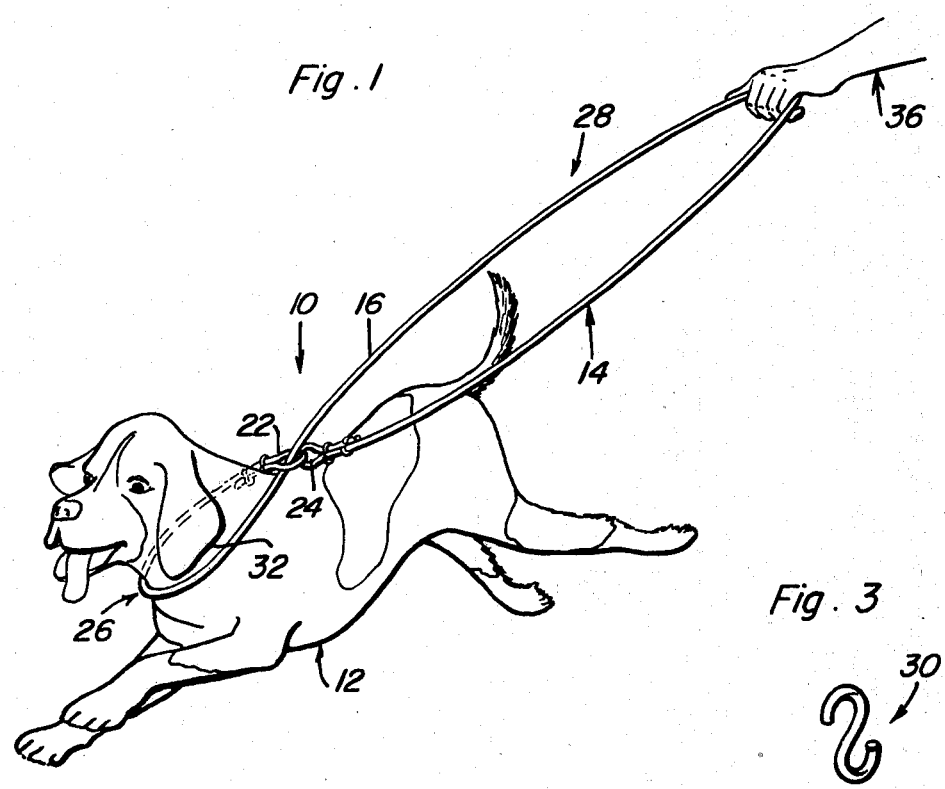
FIG. 1 is a fragmentary, perspective view showing a double action, two way slip noose according to the present invention being used for controlling an animal.

Referring now more particularly to the drawings, a double action, two way slip noose 10 according to the present invention for dogs 12 and other animals (not shown) has a single elongated flexible member 14 including an intermediate portion 16 and a pair of spaced end portions 18 and 20 terminating member 14 and themselves terminating in interengaging eyes 22 and 24, with intermediate portion 16 of member 14 being slidably received in, for example, eye 22. In this manner, member 14 forms a pair of loops 26 and 28, the purpose of which will become clear below.

Figure 3:
Figure 2:
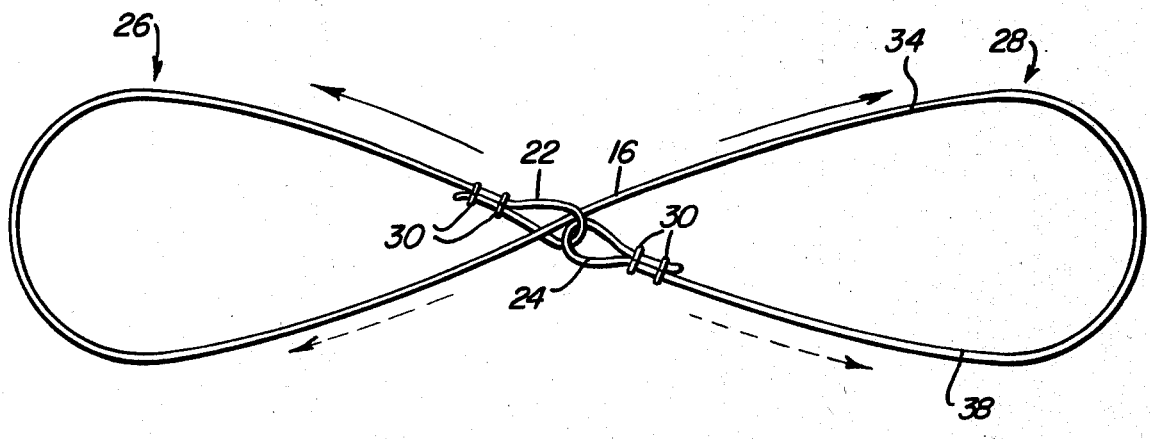
FIG. 2 is a plan view showing the noose of FIG. 1.

Flexible member 14 is advantageously a continuous piece of firm cord, such as that constructed from nylon or a similar synthetic, and each of the eyes 22, 24 is formed by at least one substantially S-shaped clip 30, which can best be seen from FIG. 3 of the drawings, securing together in side-by-side relationship a doubled-over length of the associated one of the end portions 18, 20 of flexible member 14. Preferably, a pair of such clips 30 is employed at each end portion 18, 20, as is shown in FIG. 2 of the drawings.

As can be readily appreciated from the above description and from the drawings, when loop 26, for example, is arranged about the neck 32 of dog 12, loop 28 forms a handle portion of noose 10. By pulling on portion 34 of loop 28, which is an extension of the intermediate portion 16 extending through eye 22, in the direction shown by the solid arrow in FIG. 2 of the drawings, or away from loop 26, loop 26 will be restricted, or tightened, about neck 32. The pulling on portion 34 can be easily carried out by proper manipulation of the human hand 36 shown grasping loop 28 at the extreme end of loop 28. Conversely, pulling on the other portion 38 of loop 28 in the direction indicated by the broken arrow in FIG. 2 of the drawings will permit loop 26 to expand about neck 32 by releasing pressure on intermediate portion 16 where same engages eye 22. Once again, the pulling operation may be easily carried out by hand 36.

Of course, loop 28 may be arranged about the neck 32 of dog 12 if so desired, noose 10 being completely reversible. When loop 28 is used as the neck-engaging loop, loop 26 will become the handle and may be manipulated in a like manner to loop 28 as discussed above. The solid and broken arrows associated with loop 26 in FIG. 2 of the drawings have the opposite sense of the similar arrows associated with loop 28 in the same figure. That is, the broken arrow associated with loop 26 is pulled to tighten loop 28, while the solid arrow associated with loop 26 is pulled to loosen loop 28.

Thus, a noose 10 according to the present invention provides in a simple, rugged, and reliable manner a controllable device for use with animals of any size that permits tightening and loosening of a neck-engaging loop without the handler approaching the animal. In this manner is provided a piece of equipment indispensable to: veterinarians; dog show personnel, handlers, and breeders; pet shops; zoo keepers, for smaller animals; pet owners; research institutions; agencies; and county canine control agencies, animal shelters; and the like.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A noose for dogs and other animals, comprising a single elongated flexible member having an intermediate portion and a pair of spaced end portions terminating in interengaging eyes, with the intermediate portion of the flexible member being slidably received in one of the eyes for forming a pair of loops.

2. A structure as defined in claim 1, wherein one of which loops is arrangeable around the neck of an animal, and the other of the loops forms a handle, wherein pulling of a one portion of the other of the loops arranged passing through the one of the eyes away from the one of the loops restricts the one of the loops, and pulling on the other portion of the other of the loops away from the one of the loops loosens the one of the loops.

3. A structure as defined in claim 2, wherein the flexible member is a continuous piece of firm cord, and each of the eyes are formed by at least one S-shaped clip securing together in side-by-side relationship a doubled-over length of the associated one of the end portions of the flexible member.

4. A structure as defined in claim 1, wherein the flexible member is a continuous piece of firm cord, and each of the eyes are formed by at least one S-shaped clip securing together in side-by-side relationship a doubled-over length of the associated one of the end portions of the flexible member.

5. A double action, two-way slip noose for controlling dogs and other animals comprising: a single piece of cord material suitable for a leash having two ends, means for connecting said two ends together so that double slip loops are formed, further means controllable by one hand to effect the tightening of one slip loop when the other slip loop is enlarged and to effect the loosening of said one slip loop when said other slip loop is tightened, and the means for connecting said two ends together include two small loops formed at each of the two ends and one of the said small loops being interengaged with the other small loop.

6. A structure as defined in claim 5, wherein each of the two small loops is formed by bringing the tip-most end of the cord back into side-by-side relationship with the main cord and clamping the two lengths together with S-shaped clips.

7. A structure as defined in claim 6 wherein the said further means comprises the main portion of the cord passing through one of the small loops so that the double slip loops are permanently formed in the structure and so that by pulling on the main cord of one slip loop the other slip loop is tightened, and when the main cord is released and the portion of the cord closest to the small loop is pulled the other slip loop is loosened.

8. A structure as defined in claim 5 wherein the said further means comprises the main portion of the cord passing through one of the small loops so that the double slip loops are permanently formed and so that by pulling on the main cord of one slip loop the other slip loop is tightened, and when the main cord is released and the portion of the cord closest the small loop is pulled the other slip loop is loosened.

* * * * *